United States Patent
Iino et al.

(10) Patent No.: US 9,266,486 B2
(45) Date of Patent: Feb. 23, 2016

(54) IMPACT ABSORBING STRUCTURE

(71) Applicant: Fuji Jukogyo Kabushiki Kaisha, Tokyo (JP)

(72) Inventors: Junya Iino, Tokyo (JP); Wataru Kato, Tokyo (JP); Isamu Nagasawa, Tokyo (JP); Satoshi Ikeda, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/659,766

(22) Filed: Mar. 17, 2015

(65) Prior Publication Data

US 2015/0274103 A1    Oct. 1, 2015

(30) Foreign Application Priority Data

Mar. 28, 2014    (JP) .................................. 2014-067650

(51) Int. Cl.
*B60R 19/34*    (2006.01)
*B60R 19/24*    (2006.01)
*B60R 21/00*    (2006.01)

(52) U.S. Cl.
CPC ........... *B60R 19/34* (2013.01); *B60R 2019/247* (2013.01); *B60R 2021/0009* (2013.01)

(58) Field of Classification Search
CPC ....................................................... B60R 19/34
USPC ......................................... 293/132, 133, 155
See application file for complete search history.

(56) References Cited

U.S. PATENT DOCUMENTS

| | | | |
|---|---|---|---|
| 7,252,314 B2 * | 8/2007 | Tamura et al. | 293/133 |
| 2013/0127191 A1 * | 5/2013 | Zannier | 293/133 |
| 2013/0193699 A1 * | 8/2013 | Zannier | 293/133 |
| 2013/0300138 A1 * | 11/2013 | Banasiak et al. | 293/133 |
| 2015/0001866 A1 * | 1/2015 | Noyori | 293/133 |
| 2015/0061307 A1 * | 3/2015 | Nakanishi | 293/133 |
| 2015/0197206 A1 * | 7/2015 | Tamura et al. | 293/133 |

FOREIGN PATENT DOCUMENTS

| | | |
|---|---|---|
| JP | H6-300068 | 10/1994 |
| JP | H8-170675 | 7/1996 |
| WO | WO 2014030592 A1 * | 2/2014 |

* cited by examiner

*Primary Examiner* — H Gutman
(74) *Attorney, Agent, or Firm* — Smith, Gambrell & Russell, LLP

(57) ABSTRACT

An energy absorbing member is fixed to a vehicle body. A joint has in a state where the longitudinal direction thereof extends along the front-back direction of the vehicle. Proximal and distal ends of the joint are respectively connected to the member and a bumper beam. The joint causes a collision load from the hamper beam to the vehicle body to act upon the member while collapsing in the longitudinal direction. A distal end has an inclined shape such that a distance from the member deceases gradually from the center toward the outside in the width direction of the vehicle. The distal end has a gradual increase region where a width in the height direction of the vehicle increases gradually and a gradual decrease region where the width in the height direction of the vehicle decreases gradually, from the center toward the outside in the width direction of the vehicle.

20 Claims, 5 Drawing Sheets

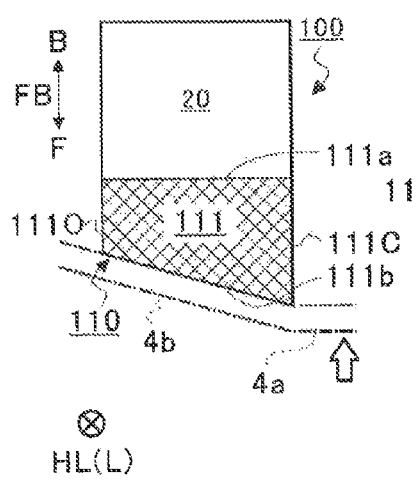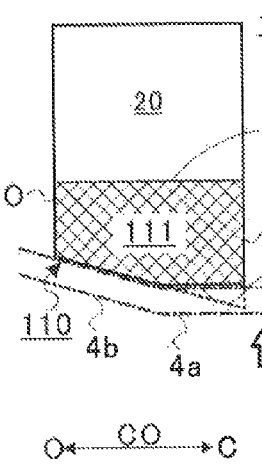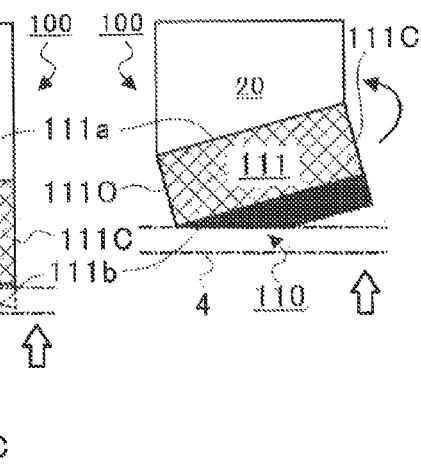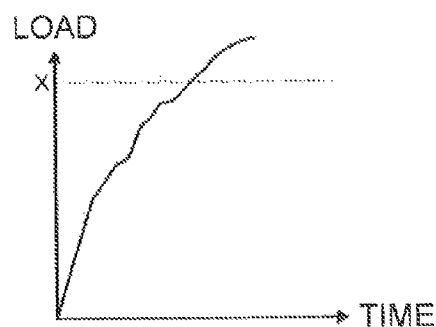

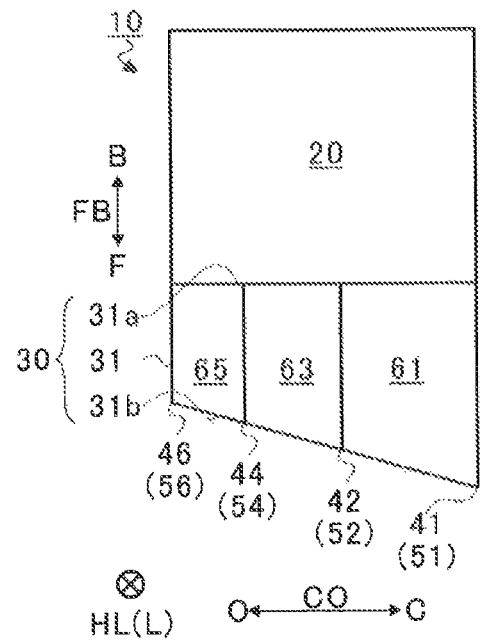
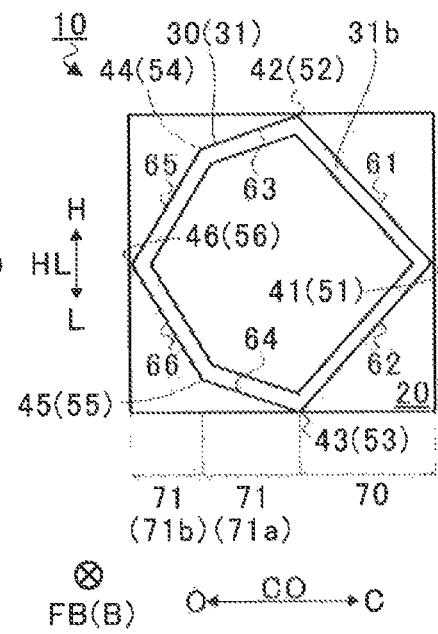
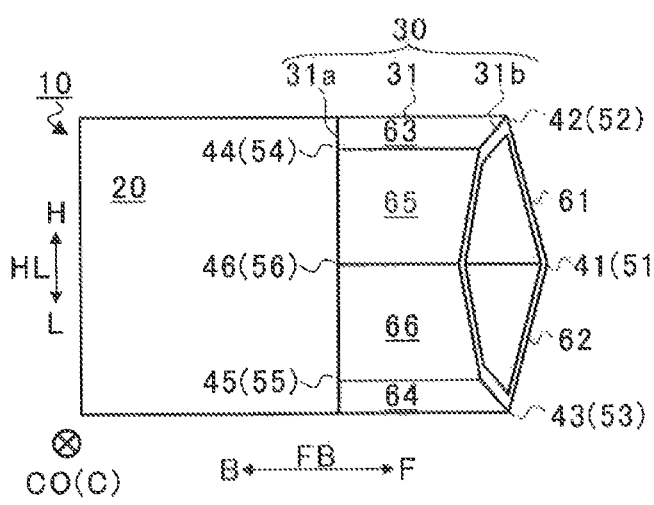

IMPACT ABSORBING STRUCTURE

CROSS-REFERENCE TO RELATED APPLICATIONS

The present application claims priority from Japanese Patent Application No. 2014-067650 filed on Mar. 28, 2014, the entire contents of which are hereby incorporated by reference.

BACKGROUND

1. Technical Field

The present invention relates to an impact absorbing structure that absorbs impacts acting upon a vehicle.

2. Related Art

In recent years, automobiles have proliferated in which a bumper beam is supported by a energy absorbing member (crush box) on a vehicle body in order to absorb impacts during collisions or the like. In addition to energy absorbing members made from steel, for example, some members are made from fiber-reinforced plastics (FRP) and carbon fiber-reinforced plastics (CFRP), as described in Japanese Unexamined Patient Application Publications No. H6-300068 and H8-170675.

The abovementioned energy absorbing members are formed in a cylindrical shape and a plurality of layers is laminated in the radial direction thereof. When a strong impact acts that can fracture the vehicle body, interlayer fracture (peeling) successively occurs in the energy absorbing member from one end to the other end in the axial direction, thereby absorbing the impact energy (progressive crushing).

However, if a load acts unevenly on the energy absorbing member, for example, such that the load acts obliquely with respect to the axial direction, the expected energy absorption characteristic cannot be demonstrated. Accordingly, comprehensive research and development have been conducted to demonstrate the energy absorption characteristic at its maximum.

The design of the joint of the energy absorbing member and the bumper beam differs depending on the barrier shape during a collision test. In particular, in the case where an offset collision is taken into account, a joint that joins the bumper beam and the energy absorbing member is provided and the tip of the joint has an inclined shape that is inclined from the center of the vehicle outward in the width direction. As a result, even when a collision load acts obliquely with respect to the bumper beam, the joint and the energy absorbing member can be reliably collapsed in the longitudinal direction and the load can be caused to act uniformly on the energy absorbing member.

However, in the case the tip of the joint is thus provided with an inclined shape with consideration for an offset collision, a crushing remainder may appear at the tip of the inclined shape in the joint at the time of a full-wrap collision. If the crushing remainder appears in the joint, the collapse propagation is blocked and a collision load equal to or greater than a set load locally acts upon the energy absorbing member before the joint collapses, whereby the amount of absorbed energy is decreased.

As describe above, in order to ensure a large amount of absorbed energy with respect to collisions of various modes, such as a full-wrap collision, while demonstrating the energy absorption characteristic at its maximum at the time of an offset collision, it is necessary too investigate the material, strength, and shape of the joint for each condition, whereby designing work becomes extremely complicated.

SUMMARY OF THE INVENTION

The present invention has been designed in consideration of the circumstances described above, and an object thereof is to provide an impact absorbing structure that can demonstrate the energy absorbing characteristic of an energy absorbing member at its maximum with respect to both an offset collision and a full-wrap collision while simplifying designing work.

In order to attain the abovementioned objective, an aspect of the present invention provides an impact absorbing structure for a vehicle that absorbs a collision load input from a bumper beam to a vehicle body, the impact absorbing structure including: an energy absorbing member fixed to the vehicle body; and a joint in which, in a state where a longitudinal direction thereof extends along a front-back direction of the vehicle, a proximal end in the longitudinal direction is connected to the energy absorbing member and a distal end in the longitudinal direction is connected to the bumper beam, and which, when a collision load is input from the bumper beam to the vehicle body, causes the load to act upon the energy absorbing member while collapsing in the longitudinal direction. The distal end of the joint connected to the bumper beam has an inclined shape such that a distance from the energy absorbing member deceases gradually from a center in a width direction of the vehicle toward an outside in the width direction, and the distal end is provided with at least either one of a gradual increase region in which a width in a height direction of the vehicle increases gradually and a gradual decrease region in which the width in the height direction of the vehicle decreases gradually, from the center in the width direction of the vehicle toward the outside in the width direction.

A cross section of the joint perpendicular to the longitudinal direction may have a polygonal shape, a ridgeline extending from the distal end to the proximal end in the longitudinal direction may be formed for each apex, and the gradual increase region or the gradual decrease region may be configured by causing each surface positioned between the ridgelines adjacent to each other in the width direction of the vehicle to incline with respect to the width direction of the vehicle.

The ridgelines may be straight lines extending along the longitudinal direction of the joint.

At least either one of the surface constituting the gradual increase region and the surface constituting the gradual decrease region may be provided in plurality, the surfaces being inclined at different angles with respect to the width direction of the vehicle.

In the joint, one central ridgeline may be positioned at a centermost position in the width direction of the vehicle, two ridgelines positioned respectively above and below the central ridgeline in the height direction of the vehicle may be positioned more outward than the central ridgeline in the width direction of the vehicle, and the gradual increase region may be formed between the central ridgeline and the two ridgelines.

In the joint, one or a plurality of outer ridgelines may be positioned at a centermost position in the width direction of the vehicle, two ridgelines positioned respectively above and below the outer ridgeline in the height direction of the vehicle may be positioned between the outer ridgeline and the central ridgeline, and the gradual decrease region may be formed between the outer ridgeline and the two ridgelines.

A cross section of the joint perpendicular to the longitudinal direction may have an axially symmetrical shape with an axis of symmetry that a line passing through a center of the joint and parallel to the width direction of the vehicle.

BRIEF DESCRIPTION OF THE DRAWINGS

FIGS. 3A-3D illustrate the operation of the impact absorber of a comparative example;

FIGS. 4A-4C illustrate the configuration of an impact absorber of an implementation of the present invention.

DETAILED DESCRIPTION

Figure 1:
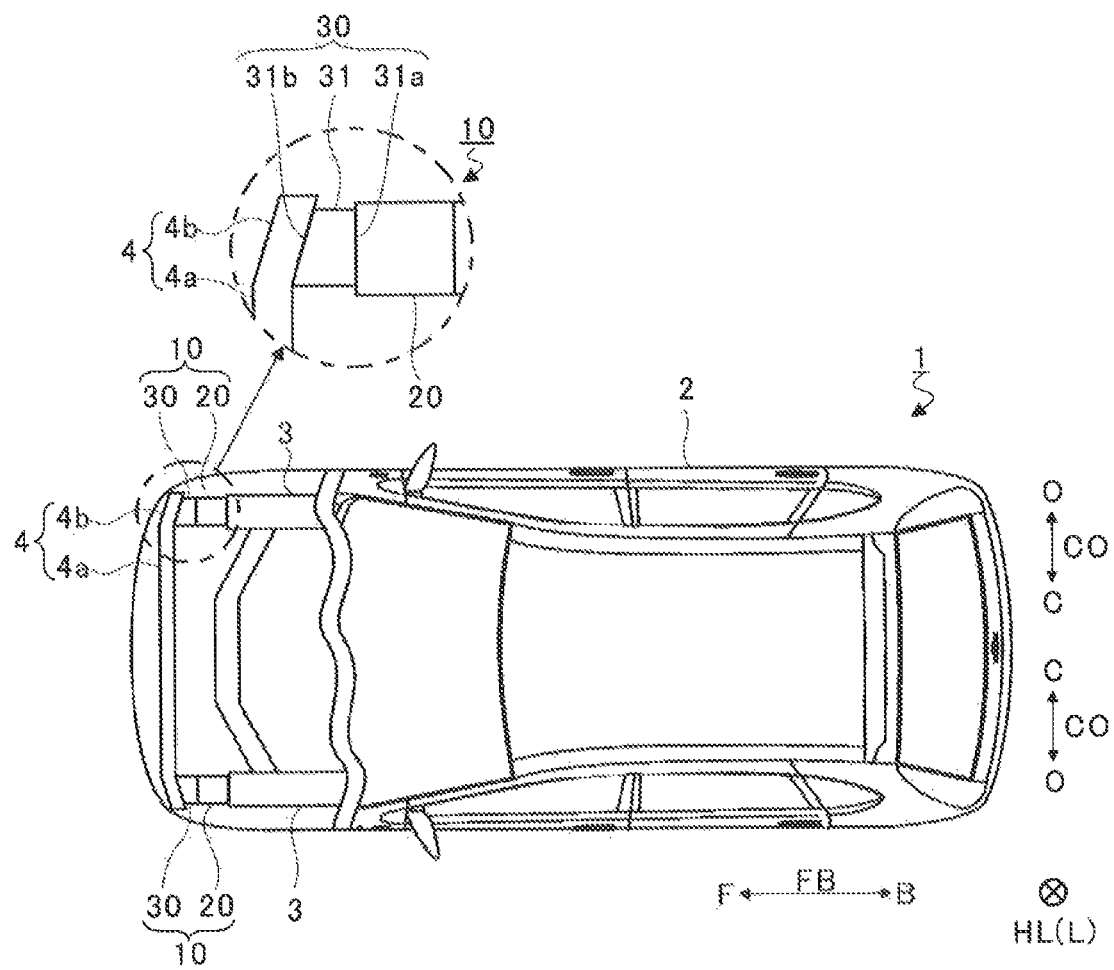
FIG. 1 is an upper view of an automobile.

The preferred implementations of the present invention will be described below in greater detail with reference to the appended drawings. The exemplary dimensions, materials, and specific numerical values indicated in the implementations merely serve to facilitate the understanding of the invention and place no limitation on the present invention, unless specifically stated otherwise. In the description and drawings, the elements having substantially the same functions and configurations are assigned with the same reference numerals and redundant explanation thereof is herein omitted. Further, the elements that have no direct relation to the present invention are not shown in the figures.

FIG. 1 is a top view of an automobile 1. In a vehicle body 2 of the automobile 1, the internal frame structure of the front positioned on the left side in FIG. 1 is simplified. In every figure described hereinbelow, the direction denoted by an arrow FB is a front-back direction of the automobile 1. In particular, an arrow F indicates the front of the automobile 1, and an arrow B indicates the back side of the automobile 1. The direction denoted by an arrow CO is a width direction of the automobile 1, an arrow C indicated a center in the width direction of the automobile 1, and an arrow O indicates an outer side in the width direction of the automobile 1. The direction denoted by an arrow HL is a height direction of the automobile 1, an arrow H indicates an upper side of the automobile 1, and an arrow L indicates a lower side of the automobile 1.

As depicted in FIG. 1, the automobile 1 is provided with two side frames 3 that extend in the front-back direction of the vehicle (automobile 1) and are arranged parallel to each other at a distance from each other in the width direction of the vehicle at the front of the vehicle body 2. At the front end of each side frame 3, a bumper beam 4 is supported, by an impact absorber 10, and when a collision load acts from the bumper beam 4 upon the vehicle body 2, the impact absorber 10 collapses in the front-back direction of the vehicle and absorbs the energy acting upon the vehicle body 2.

More specifically, the impact absorber 10 is configured by an energy absorbing member 20 fixed at the front end of the side frame 3 such that the collapse direction is along the front-back direction of the vehicle, and a joint 30 that connects the energy absorbing member 20 and the bumper beam 4. The energy absorbing member 20 is the so-called crush box, has a cylindrical shape in which a plurality of layers constituted by a composite material, for example, a fiber-reinforced plastic (FRP, for example, a carbon fiber-reinforced plastic (CFRP)) is laminated in the radial direction, and is fixed to the side frame 3 in a state where the central axis thereof matches the front-back direction of the vehicle. Since the energy absorbing member 20 has a well-known configuration, detailed explanation thereof is herein omitted, but the configuration of the energy absorbing member 20 is not particularly limited, provided that the energy input from the bumper beam 4 to the vehicle body 2 can be absorbed.

Further, the joint 30 is provided, for example, with a main body 31 constituted by a hollow member made from a ferrous metal. In a state where the longitudinal direction is along the front-back direction of the vehicle, a proximal end 31a of the main body 31 which is positioned on the longitudinally proximal end is connected by welding, or the like, to the energy absorbing member 20, and a distal end 31b positioned at the longitudinally distal end of the main body 31 is connected by welding, or the like, to the bumper beam 4.

The impact absorber 10 of the present implementation is designed with consideration for an offset collision, and the distal end 31b of the main body 31, which is connected to the bumper beam 4, has an inclined shape such that the distance thereof from the energy absorbing member 20 decreases gradually from the center in the width direction of the vehicle toward the outer side in the width direction. More specifically, the bumper beam 4 is provided with an extending portion 4a extending along the width direction of the vehicle and a support 4b at each end of the extending portion 4a on the outer side in the width direction, the supports 4b being bent at a predetermined angle toward the back side of the vehicle. The distal end 31b of the main body 31 is inclined with respect to the width direction of the vehicle at the same angle as the bending angle of the support 4b, and the distal end 31b is welded in a state of surface contact to the surface of the support 4b facing the back side of the vehicle. As a result, even when a collision load acts upon the bumper beam 4 as a result of an offset collision, the load acts upon the energy absorbing member 20 while the main body 31 of the joint 30 is reliably collapsed in the longitudinal direction.

However, a collision test clearly demonstrates that where the distal end 31b is provided with an inclined shape with consideration for only an offset collision, a crushing remainder can appear on the distal end of the main body 31 at the time of a full-wrap collision. Where the crushing remainder appears in the main body 31 of the joint 30, the propagation of the collapse is blocked, a collision load equal to or greater than a set load acts partially upon the energy absorbing member 20 before the joint 30 (main body 31) collapses, and the amount of absorbed energy decreases. The configuration and operation of an impact absorber 100 of a comparative example is described below, and then the configuration of an impact absorber 10 of the present implementation is described in greater detail.

Figure 2A:
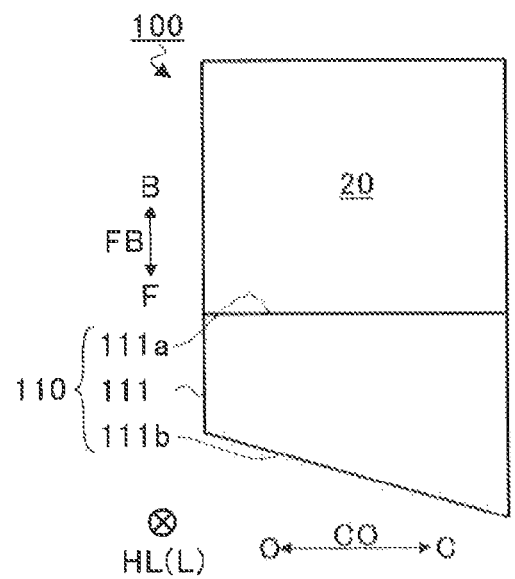
FIGS. 2A-2C illustrate the configuration of an impact absorber of a comparative example.
Figure 2C:
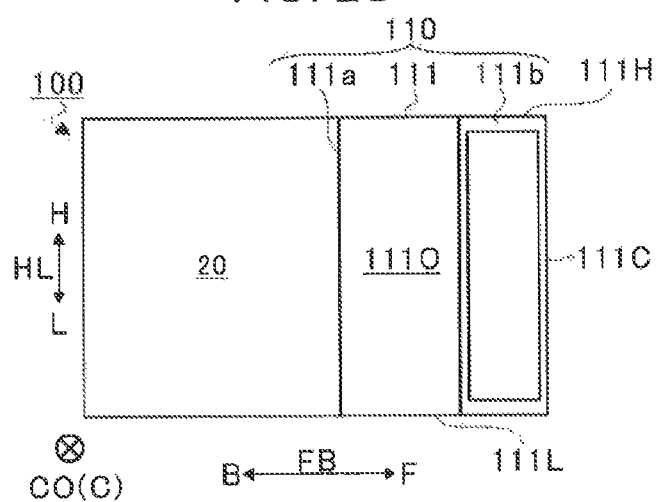
Figure 2B:
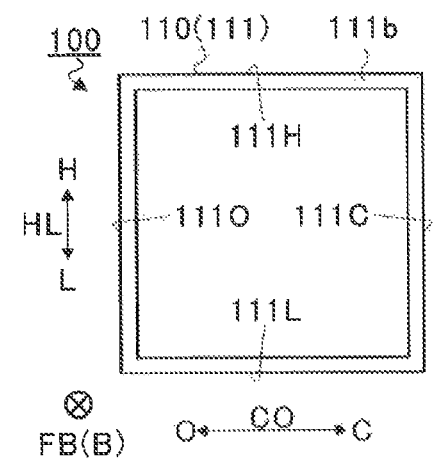

FIGS. 2A-2C illustrates the configuration of the impact absorber 100 of a comparative example. FIG. 2A is a top view of the impact absorber 100, FIG. 2B is a front view of the impact absorber 100, and FIG. 2C is a side view of the impact absorber 100. The explanation herein presumes that the impact absorber 100 is connected, instead of the impact absorber 10 of the present implementation, between the above-described side frame 3 and the bumper beam 4. As depicted in FIGS. 2A-2C, the impact absorber 100 of a comparative example is constituted by the above-described energy absorbing member 20 and a joint 110 that connects the energy absorbing member 20 and the bumper beam 4.

The joint 110 is provided with a main body 111 constituted by a hollow member made from a ferrous metal. In a state where the longitudinal direction (collapse direction, axial direction) is along the front-back direction of the vehicle, a proximal end 111a of the main body 111 which is positioned on the longitudinally proximal end is connected lay welding, or the like, to the energy absorbing member 20, and a distal end 111b positioned at the longitudinally distal end of the main body 111 is connected by welding, or the like, to the bumper beam 4. Since the joint 110 is connected to the support 4b of the bumper beam 4 (see FIG. 1), the distal end 111b of the main body 111 has an inclined shape such that the distance thereof from the energy absorbing member 20 decreases gradually from the center in the width direction of the vehicle toward the outer side in the width direction, in the same manner as the joint 30 of the present implementation.

The main body 111 has a quadrangular columnar shape, and the cross section thereof perpendicular to the longitudinal direction has a substantially rectangular shape, as depicted in FIG. 2B. In a mounted state of connection between the side frame 3 and the bumper beam 4, a side surface 111C of the main body 111 is positioned on the center in the width direction of the vehicle, a side surface 111O is positioned on the outer side in the width direction of the vehicle, and those side surfaces 111C and 111O are parallel to the width direction of the vehicle and face each other. Further, an upper surface 111H of the main body 111 is positioned on the upper side in the height direction of the vehicle, a bottom surface 111L is positioned on the lower side in the height direction of the vehicle, and those upper surface 111H and the bottom surface 111L are parallel to the height direction of the vehicle and face each other.

FIGS. 3A-3D illustrates the operation of the impact absorber 100 of the comparative example. It is assumed that a collision load acts, as shown by a white arrow in FIG. 3A, on the bumper beam 4 as a result of a full-wrap collision. In this case, as depicted in FIG. 3B, the bumper beam 4 bites in the direction of approaching the energy absorbing member 20, while collapsing the main body 111 of the joint 110 in the longitudinal direction. In this case, in the bumper beam 4, the bending point of the extending portion 4a and the support 4b moves gradually outward in the width direction of the vehicle, in other words, the extending portion 4a elongates gradually in the width direction of the vehicle and approaches the energy absorbing member 20. Where the distal end 111b thus collapses till it becomes parallel to the width direction of the vehicle, a collision load acts uniformly in the direction perpendicular to the longitudinal direction upon the main body 111, and when the main body 111 entirely collapses, the energy absorbing member 20 starts collapsing.

In this case, the cross-sectional area of the main body 111 is set such that the main body collapses under tire effect of a load less than that required to collapse the energy absorbing member 20, and as the cross-sectional area of the main body 111 decreases, the load resistance thereof decreases and the collapse propagation is facilitated. Further, at the time of a full-wrap collision, the collapse propagates in the longitudinal direction, with the side surface 111C side as a base point, in the distal end 111b of the main body 111, but the side surface 111C has a length in the height direction of the vehicle and the load resistance increases immediately after the start of collapse in the main body 111 at the time of full-wrap collision.

Therefore, immediately after the full-wrap collision has occurred, as depicted in FIG. 3D, the collision load acting upon the main body 111 rises at once over a short period of time, and as depicted in FIG. 3C, the inclined portion provided at the distal end of the main body 111 becomes a crushing remainder (depicted by blackening in FIG. 3C), and a collision load can be input to the energy absorbing member 20 while the crushing remainder is still present. In this case, on the side surface 111C of the main body 111, a collision load exceeding a predicted set load (X) at which the energy absorbing member 20 starts collapsing is input to the energy absorbing member 20. As a result, as depicted in FIG. 3C, the collision load is input obliquely with respect to the energy absorbing member 20, and the energy absorption characteristic inherent to the energy absorbing member 20 cannot be demonstrated. Accordingly, in the present implementation, the joint 30 is configured in the following manner so as to demonstrate the energy absorption characteristic of the energy absorbing member 20 at its maximum even at the time of a full-wrap collision.

FIGS. 4A-4C illustrates the configuration of the impact absorber 10 of the present implementation. FIG. 4A is a top view of the impact absorber 10, FIG. 4B is a front view of the impact absorber 10, and FIG. 4C is a side view of the impact absorber 10. In a state where the longitudinal direction is along the front-back direction of the vehicle, as shown in FIGS. 4A-4C, the proximal end 31a of the main body 31 of the joint 30 is connected by welding, or the like, to the energy absorbing member 20, and the distal end 31b is connected by welding, or the like, to the support 4b (see FIG. 1) of the bumper beam 4. As has been described hereinabove, the distal end 31b has an inclined shape such that the distance from the energy absorbing member 20 to the distal end decreases gradually from the center in the width direction of the vehicle toward the outer side in the width direction.

As also clearly seen in FIG. 4B, the cross section of the main body 31 of the joint 30 perpendicular to the longitudinal direction (front-back direction of the vehicle) has a polygonal (hexagonal in the present implementation) shape having six apexes 41 to 46, and a ridgeline 50 extending from the distal end 31b to the proximal end 31a is formed for each apex 41 to 46. More specifically, in the main body 31 of the joint 30, one ridgeline 50 (referred to hereinbelow as "central ridgeline 51") formed by connection to the apex 41 in the longitudinal direction is positioned at the centermost position in the width direction of the vehicle. More outward than the central ridgeline 51 in the width direction of the vehicle, the apexes 42 and 43 are positioned respectively above and below the central ridgeline 51 in the height direction of the vehicle, and two ridgelines 50 (ridgelines 52 and 53) formed by connection to the apexes 42 and 43 in the longitudinal direction are provided.

Apexes 44 and 45 are positioned within a height range of the ridgelines 52 and 53 further more outward than the ridgelines 52 and 53 in the width direction of the vehicle, and two ridgelines 50 (ridgelines 54 and 55) formed by connection to the apexes 44 and 45 in the longitudinal direction are provided. In the main body 31 of the joint 30, one ridgeline 50 (referred no hereinbelow as "outer ridgeline 56") formed by connection to the apex 46 in the longitudinal direction is positioned at the outermost position in the width direction of the vehicle.

Each ridgeline 50 extends linearly along the longitudinal direction, of the main body 31 of the joint 30, and flat surfaces 61 to 66 are formed between, every two ridgelines 50 adjacent in the width direction of the vehicle. More specifically, the surface 61 is provided between the central ridgeline 51 and the ridgeline 52, the surface 62 is provided between the central ridgeline 51 and the ridgeline 53, the surface 63 is provided between the ridgeline 52 and the ridgeline 54, the surface 64 is provided between the ridgeline 53 and the ridgeline 55, the surface 65 is provided between the ridgeline 54 and the outer ridgeline 56, and the surface 66 is provided between the ridgeline 55 and the outer ridgeline 56.

The central ridgeline 51 and the outer ridgeline 56 are at the same position in the height direction of the vehicle, the ridgeline 52 is positioned above the central ridgeline 51 and the outer ridgeline 56, and the position of the ridgeline 54 in the height direction of the vehicle is between the ridgeline 52 and the outer ridgeline 56. Meanwhile, the ridgeline 53 is positioned below the central ridgeline 51 and the outer ridgeline 56, and the position of the ridgeline 55 in the height direction of the vehicle is between the ridgeline 53 and the outer ridgeline 56. Further, the ridgelines 52 and 53 have the same position in the width direction of the vehicle, and the ridgelines 54 and 55 also have the same position in the width direction of the vehicle. Therefore, the cross section of the main body 31 of the joint 30 perpendicular to the longitudinal direction has an axially symmetrical shape with an axis of symmetry being a line passing through the center of the main body 31 and parallel to the width direction of the vehicle.

Further, as depicted in FIG. 4B, the surfaces 61 and 62 are inclined at a predetermined angle from the center in the width direction of the vehicle toward the outside in the width direction, the central ridgeline 51 serving as a base point, and extend such that the distance therebetween increases in the height direction of the vehicle. In other words, in the main body 31, a gradual increase region 70, in which the width in the height direction of the vehicle increases gradually from the center in the width direction of the vehicle toward the outside in the width direction, is formed between the central ridgeline 51 and two ridgelines 52 and 53.

By contrast, the surfaces 63 and 64 extend so as to get closer to each other in the height direction of the vehicle with the transition from the center in the width direction of the vehicle to the outside in the width direction. In other words, in the main body 31, a gradual decrease region 71 (first gradual decrease region 71a), in which the width in the height direction of the vehicle decreases gradually from the center in the width direction of the vehicle toward the outside in the width direction, is configured from the central ridgeline 52 and 53 to the ridgelines 54 and 55. Further, the surfaces 65 and 66 also extend so as to get closer to each other in the height direction of the vehicle with the transition from the center in the width direction of the vehicle to the outside in the width direction. In other words, in the main body 31, a gradual decrease region 71 (second gradual decrease region 71b), in which the width in the height direction of the vehicle decreases gradually from the center in the width direction of the vehicle toward the outside in the width direction, is configured from the central ridgeline 54 and 55 to the outer ridgeline 56.

Thus, in the joint 30 of the present implementation, the gradual increase region 70 or the gradual decrease region 71 is configured in the main body 31 by inclining, with respect to the width direction of the vehicle, the surfaces 61 to 66 positioned between the ridgelines 50 adjacent in the width direction of the vehicle. Further, the first gradual decrease region 71a and the second gradual decrease region 71b that differ from each other in the decrease rate of the width of the main body 31 with the distance in the width direction of the vehicle are configured by creating different inclination angles with respect to the width direction of the vehicle in the surface 63 (64) and surface 65 (66), among the surfaces 63 to 66 constituting the gradual decrease region 71.

Figure 5A:
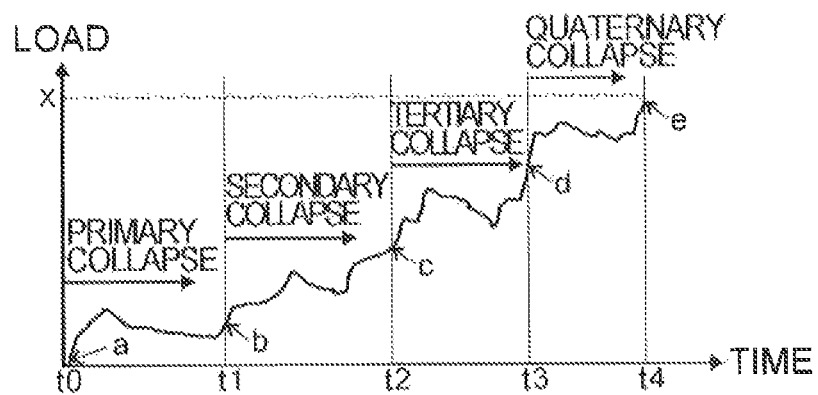
FIGS. 5A-5C illustrate the operation of the impact absorber of the implementation.
Figure 5B:
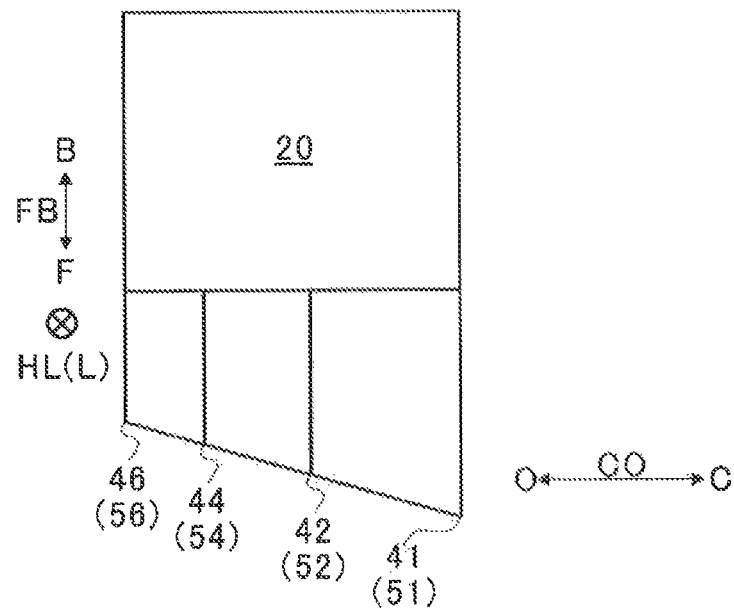
Figure 5C:
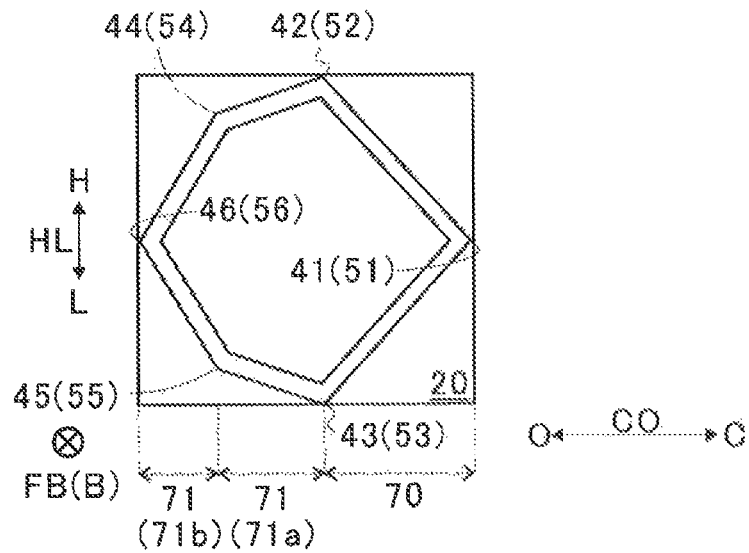

FIGS. 5A-5C illustrates the operation of the impact absorber 10 of the present implementation. At the time of a full-wrap collision, the collapse of the joint 30 propagates in the longitudinal direction, with the central ridgeline 51 in the distal end 31b of the main body 31 being a base point, in the same manner as in the above-described comparative example. In this case since the joint 30 is connected to the bumper beam 4 at one point of the central ridgeline 51, the collision load input to the bumper beam 4 is concentrated in the central ridgeline 51. Thus, as a result of the stress being concentrated in one point of the joint 30, the collapse rapidly propagates from the central ridgeline 51 in the collapse start point (point a in FIG. 5A) of the joint 30.

Once a time t1 elapses since the start of collapse, the collapse propagates to the ridgelines 52 and 53 as depicted in FIGS. 5B and 5C. Where the collapse thus reaches the ridgelines 52 and 53, as depicted in FIG. 5A, the secondary collapse (point b in FIG. 5A) is started. Once a time t2 elapses since the start of collapse, the collapse propagates to the ridgelines 54 and 55, as depicted in FIGS. 5B and 5C, and the tertiary collapse is started point c in FIG. 5A). Once a time t3 elapses since the start of collapse, the collapse propagates to the ridgeline 55 and the quaternary collapse (point d in FIG. 5A) is started. The joint 30 then collapses in the axial direction, and once a time t4 elapses since the start of collapse, the joint 30 is entirely crushed, the load input to the energy absorbing member 20 exceeds a set load X, and the fracture of the energy absorbing member 20 is started (point e in FIG. 5A).

Thus, with the impact absorber 10 of the present implementation, the input load is controlled so as to increase gradually for each ridgeline 50, and a large collision load is prevented from being input at once to the energy absorbing member 20. Further, since the collapse propagates in a plurality of stages for each ridgeline 50, no collapse remainder appears at the distal end of the joint 30 which has been formed to be inclined with consideration for an offset collision. Therefore, the joint 30 can be collapsed uniformly in the axial direction, a collision load can be caused to act uniformly upon the energy absorbing member 20, and she desired energy absorption characteristic can be demonstrated.

Further, as mentioned hereinabove, since the input load can be easily controlled for each ridgeline 50, the relationship between the input load and the interval of time from the input of the collision load to the start of the fracture of the energy absorbing member 20 can be easily set by adjusting the number and positions of the ridgelines 50. As a result, the energy absorption characteristic can be demonstrated at its maximum with respect to both the offset collision and the full-wrap collision while simplifying the design operation.

The preferred implementations of the present invention are described hereinabove with reference to the appended drawings, but it goes without saying that the present invention is not limited to the above-described implementations, and various changes and modifications which do not depart from the scope of the claims are obviously also included in the technical scope of the present invention.

For example, in the case described in the implementations, the joint 30 has a polygonal cross section having the apexes 41 to 46, but the joint 30 is not limited to the polygonal cross section and may be configured to have a curved outer shape constituted by curved lines. Further, in the implementations, the gradual increase region 70 is provided on the center in the width direction of the vehicle and two gradual decrease regions 71 that differ in the gradual decrease rate are provided on the outside, in the width direction of the vehicle, of the gradual increase region 70, but it goes without saying that the number and arrangement of the gradual increase regions 70 and gradual decrease regions 71 may be designed as appropriate. Therefore, the gradual decrease region 71 may be provided on the center in the width direction of the vehicle, only the gradual decrease regions 71 may be provided, or only the gradual increase regions 70 may be provided. In any case, it is possible to provide either one or both of the gradual increase region in which the width in the height direction of the vehicle increases gradually and the gradual decrease region in which the width in the height direction of the vehicle decreases gradually from the center in the width direction of the vehicle toward the outside in the width direction.

Further, in the case described in the implementations, the ridgelines 50 are straight lines extending along the longitudinal direction of the joint 30, but the ridgelines 50 are not necessary the straight lines, and a plurality of ridgelines 50 may be not parallel to each other. Further, in the case described in the implementation, the joint 30 has an axially symmetrical cross-sectional shape, but the cross-sectional shape of the joint 30 is not necessarily axially symmetrical. Furthermore, the thickness of the joint 30 may be constant or uneven.

Further, in the implementations only one outer ridgeline 56 is shown, but a plurality of such lines may be also used.

In accordance with the present invention, it is possible to demonstrate the energy absorbing characteristic of the energy absorbing member at its maximum with respect to both an offset collision and a full-wrap collision while simplifying the design operation.

The present invention can be used in an impact absorbing structure that absorbs impacts input into a vehicle.

The invention claimed is:

1. An impact absorbing structure for a vehicle that absorbs a collision load input from a bumper beam to a vehicle body, the impact absorbing structure comprising:
    an energy absorbing member fixed to the vehicle body; and
    a joint in which, in a state where a longitudinal direction thereof extends along a front-back direction of the vehicle, a proximal end in the longitudinal direction is connected to the energy absorbing member and a distal end in the longitudinal direction is connected to the bumper beam, and which, when a collision load is input from the bumper beam to the vehicle body, causes the load to act upon the energy absorbing member while collapsing in the longitudinal direction, wherein
    the distal end of the joint connected to the bumper beam has an inclined shape such that a distance from the energy absorbing member decreases gradually from a center in a width direction of the vehicle toward an outside in the width direction, and the distal end is provided with at least either one of a gradual increase region in which a width in a height direction of the vehicle increases gradually and a gradual decrease region in which the width in the height direction of the vehicle decreases gradually, from the center in the width direction of the vehicle toward the outside in the width direction.

2. The impact absorbing structure according to claim 1, wherein a cross section of the joint perpendicular to the longitudinal direction has a polygonal shape, a ridgeline extending from the distal end to the proximal end in the longitudinal direction is formed for each apex, and the gradual increase region or the gradual decrease region is configured by causing each surface positioned between the ridgelines adjacent to each other in the width direction of the vehicle to incline with respect to the width direction of the vehicle.

3. The impact absorbing structure according to claim 2, wherein the ridgelines are straight lines extending along the longitudinal direction of the joint.

4. The impact absorbing structure according to claim 2, wherein at least either one of the surface constituting the gradual increase region and the surface constituting the gradual decrease region comprises a plurality of component surfaces, the component surfaces being inclined at different angles from one another with respect to the width direction of the vehicle.

5. The impact absorbing structure according to claim 3, wherein at least either one of the surface constituting the gradual increase region and the surface constituting the gradual decrease region comprises a plurality of component surfaces, the component surfaces being inclined at different angles from one another with respect to the width direction of the vehicle.

6. The impact absorbing structure according to claim 2, wherein in the joint, one central ridgeline is positioned at a centermost position in the width direction of the vehicle, two ridgelines positioned respectively above and below the central ridgeline in the height direction of the vehicle are positioned more outward than the central ridgeline in the width direction of the vehicle, and the gradual increase region is formed between the central ridgeline and the two ridgelines.

7. The impact absorbing structure according to claim 3, wherein in the joint, one central ridgeline is positioned at a centermost position in the width direction of the vehicle, two ridgelines positioned respectively above and below the central ridgeline in the height direction of the vehicle are positioned more outward than the central ridgeline in the width direction of the vehicle, and the gradual increase region is formed between the central ridgeline and the two ridgelines.

8. The impact absorbing structure according to claim 4, wherein in the joint, one central ridgeline is positioned at a centermost position in the width direction of the vehicle, two ridgelines positioned respectively above and below the central ridgeline in the height direction of the vehicle are positioned more outward than the central ridgeline in the width direction of the vehicle, and the gradual increase region is formed between the central ridgeline and the two ridgelines.

9. The impact absorbing structure according to claim 5, wherein in the joint, one central ridgeline is positioned at a centermost position in the width direction of the vehicle, two ridgelines positioned respectively above and below the central ridgeline in the height direction of the vehicle are positioned more outward than the central ridgeline in the width direction of the vehicle, and the gradual increase region is formed between the central ridgeline and the two ridgelines.

10. The impact absorbing structure according to claim 6, wherein in the joint, one or a plurality of outer ridgelines is positioned at an outermost position in the width direction of the vehicle, two intermediate ridgelines positioned respectively above and below the outer ridgeline in the height direction of the vehicle are positioned between the one or plurality of outer ridgelines and the central ridgeline, and the gradual decrease region is formed between the one or plurality of outer ridgelines and the two intermediate ridgelines.

11. The impact absorbing structure according to claim 7, wherein in the joint, one or a plurality of outer ridgelines is positioned at an outermost position in the width direction of the vehicle, two intermediate ridgelines positioned respectively above and below the outer ridgeline in the height direction of the vehicle are positioned between the one or plurality of outer ridgelines and the central ridgeline, and the gradual decrease region is formed between the one or plurality of outer ridgelines and the two intermediate ridgelines.

12. The impact absorbing structure according to claim 8, wherein in the joint, one or a plurality of outer ridgelines is positioned at an outermost position in the width direction of the vehicle, two intermediate ridgelines positioned respectively above and below the outer ridgeline in the height direction of the vehicle are positioned between the one or plurality of outer ridgelines and the central ridgeline, and the gradual decrease region is formed between the one or plurality of outer ridgelines and the two intermediate ridgelines.

13. The impact absorbing structure according to claim 9, wherein in the joint, one or a plurality of outer ridgelines is positioned at an outermost position in the width direction of the vehicle, two intermediate ridgelines positioned respectively above and below the outer ridgeline in the height direction of the vehicle are positioned between the one or plurality of outer ridgelines and the central ridgeline, and the gradual decrease region is formed between the one or plurality of outer ridgelines and the two intermediate ridgelines.

14. The impact absorbing structure according to claim 1, wherein a cross section of the joint perpendicular to the longitudinal direction has an axially symmetrical shape with an axis of symmetry that is a line passing through a center of the joint and parallel to the width direction of the vehicle.

15. The impact absorbing structure according to claim 2, wherein a cross section of the joint perpendicular to the longitudinal direction has an axially symmetrical shape with an axis of symmetry that is a line passing through a center of the joint and parallel to the width direction of the vehicle.

16. The impact absorbing structure according to claim 3, wherein a cross section of the joint perpendicular to the longitudinal direction has an axially symmetrical shape with an axis of symmetry that is a line passing through a center of the joint and parallel to the width direction of the vehicle.

17. The impact absorbing structure according to claim 4, wherein a cross section of the joint perpendicular to the longitudinal direction has an axially symmetrical shape with an axis of symmetry that is a line passing through a center of the joint and parallel to the width direction of the vehicle.

18. The impact absorbing structure according to claim 5, wherein a cross section of the joint perpendicular to the longitudinal direction has an axially symmetrical shape with an axis of symmetry that is a line passing through a center of the joint and parallel to the width direction of the vehicle.

19. The impact absorbing structure according to claim 1, wherein the inclined shape of the distal end of the joint is such that the distance from the energy absorbing member decreases gradually from a center in a width direction of the vehicle toward an outside in the width direction along the entire width of the joint.

20. The impact absorbing structure according to claim 1, wherein
if the distal end includes the gradual increase region, the gradual increase region extends from a centermost position in the width direction of the vehicle to a point of maximum width in the height direction of the vehicle, with the gradual increase region being free of any regions of width decrease in the height direction of the vehicle; and
if the distal end includes the gradual decrease region, the gradual decrease region extends from a point of maximum width in the height direction of the vehicle to an outermost position in the width direction of the vehicle, with the gradual decrease region being free of any regions of width increase in the height direction of the vehicle.

* * * * *